(12) United States Patent
Smith (10) Patent No.: US 7,408,718 B2
(45) Date of Patent: Aug. 5, 2008

(54) LENS ARRAY IMAGING WITH CROSS-TALK INHIBITING OPTICAL STOP STRUCTURE

(75) Inventor: George E. Smith, San Jose, CA (US)

(73) Assignee: Avago Technologies General Pte Ltd, Singapore (SG)

( * ) Notice: Subject to any disclaimer, the term of this patent is extended or adjusted under 35 U.S.C. 154(b) by 0 days.

(21) Appl. No.: 11/516,993

(22) Filed: Sep. 7, 2006

(65) Prior Publication Data

US 2008/0074755 A1  Mar. 27, 2008

(51) Int. Cl.
G02B 15/02 (2006.01)
(52) U.S. Cl. ..................................................... 359/673
(58) Field of Classification Search ................. 359/673; 250/221, 222, 2; 345/163
See application file for complete search history.

(56) References Cited

U.S. PATENT DOCUMENTS

| | | | |
|---|---|---|---|
| 3,899,778 A | 8/1975 | Roberts | |
| 4,421,379 A | 12/1983 | Grumet et al. | |
| 5,907,152 A | 5/1999 | Dandliker | |
| 6,825,932 B2 | 11/2004 | Suzuki et al. | |
| 6,927,758 B1 * | 8/2005 | Piot et al. | 345/166 |
| 6,967,321 B2 * | 11/2005 | Leong et al. | 250/239 |
| 6,967,718 B1 * | 11/2005 | Carlisle et al. | 356/328 |
| 7,009,681 B2 | 3/2006 | Shinoda | |
| 2002/0104957 A1 | 8/2002 | Liess et al. | |
| 2002/0167489 A1 | 11/2002 | Davis | |
| 2003/0034959 A1 * | 2/2003 | Davis et al. | 345/166 |
| 2004/0084610 A1 * | 5/2004 | Leong et al. | 250/221 |
| 2005/0168445 A1 * | 8/2005 | Piot et al. | 345/163 |
| 2005/0275618 A1 | 12/2005 | Juh et al. | |
| 2006/0055811 A1 * | 3/2006 | Frtiz et al. | 348/340 |
| 2006/0176581 A1 * | 8/2006 | Lu | 359/738 |
| 2006/0208170 A1 * | 9/2006 | Xie | 250/221 |
| 2007/0097249 A1 * | 5/2007 | Korenaga | 348/335 |
| 2007/0097512 A1 * | 5/2007 | Toyoda et al. | 359/626 |

FOREIGN PATENT DOCUMENTS

| | | |
|---|---|---|
| EP | 0081348 | 6/1983 |
| EP | 1073005 | 1/2001 |
| EP | 1241616 | 9/2002 |
| EP | 1429235 | 6/2004 |
| EP | 1429235 A1 * | 6/2004 |

* cited by examiner

Primary Examiner—Hung X. Dang
Assistant Examiner—Vipin M Patel (57) ABSTRACT

An apparatus includes an optical sensor, a lens system, and an optical stop system. The optical sensor includes photocells each of which has a respective photocell active area in a capture plane. The lens system includes lenses each of which is operable to focus light from a respective subfield of a scene into a corresponding focused beam. The optical stop system includes aperture systems each of which confines a corresponding one of the focused beams to a respective illumination area in the capture plane. In a method, light from respective subfields of a scene is focused into corresponding focused beams. Corresponding ones of the focused beams are confined to respective non-overlapping illumination areas in the capture plane. Optical data is generated from light of the focused beams illuminating the illumination areas. Motion measures indicative of movement in relation to the scene are produced from the optical data.

28 Claims, 5 Drawing Sheets

LENS ARRAY IMAGING WITH CROSS-TALK INHIBITING OPTICAL STOP STRUCTURE

CROSS-REFERENCE TO RELATED APPLICATIONS

This application relates to copending U.S. patent application Ser. No. 11/085,282, filed Mar. 21, 2005, by Tong Xie and entitled "Compact and Low Profile Optical Navigation Device," which is incorporated herein by reference.

BACKGROUND

Imaging devices are being incorporated in a wide variety of devices, including digital still image cameras, digital video cameras, cameras designed for desktop and mobile computers (often referred to as "pc cameras"), input devices (e.g., optical navigations sensors in computer mice), handheld electronic devices (e.g., mobile telephones), and other embedded environments. With the increasing trends of minimizing the sizes of devices and combining multiple functionalities into single devices, there is a constant push toward reducing the space required for implementing each and every device functionality, including imaging functionality.

Most imaging devices require large and bulky components that cannot be accommodated in most compact device environments. For example, optical navigation sensors typically are designed to track features in high quality images of areas of a navigation surface that are on the order of one square millimeter and are captured through imaging optics with a magnification in the range of 2:1 to 1:2. In a typical optical navigation sensor design, the imaging optics consist of a single plastic molded lens, and the image sensor consists of a 20×20 photocell array with a 50 micrometer ($\mu$m) pitch. An optical navigation sensor module with these imaging components and capable of satisfying these operating specifications typically requires a spacing of more than ten millimeters (mm) between the image sensor and the navigation surface.

The size constraints inherent in traditional optical navigation sensor designs are not a significant issue in application environments such as desktop computer mice. These size constraints, however, will inhibit the incorporation of optical navigation sensor technology in compact application environments, such as handheld electronic devices (e.g., mobile telephones) and other embedded environments. What are needed are imaging systems and methods that are capable of satisfying the significant size constraints of compact imaging application environments.

SUMMARY

In one aspect, the invention features an apparatus that includes an optical sensor, a lens system, and an optical stop system. The optical sensor includes photocells each of which has a respective photocell active area in a capture plane. The lens system includes lenses each of which is operable to focus light from a respective subfield of a scene into a corresponding focused beam. The optical stop system includes aperture systems each of which confines a corresponding one of the focused beams to a respective illumination area in the capture plane.

In one aspect, the invention features a method, in accordance with which light from respective subfields of a scene is focused into corresponding focused beams. Corresponding ones of the focused beams are confined to respective non-overlapping illumination areas in the capture plane. Optical data is generated from light of the focused beams illuminating the illumination areas. Motion measures indicative of movement in relation to the scene are produced from the optical data.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

A. Introduction

Figure 1:
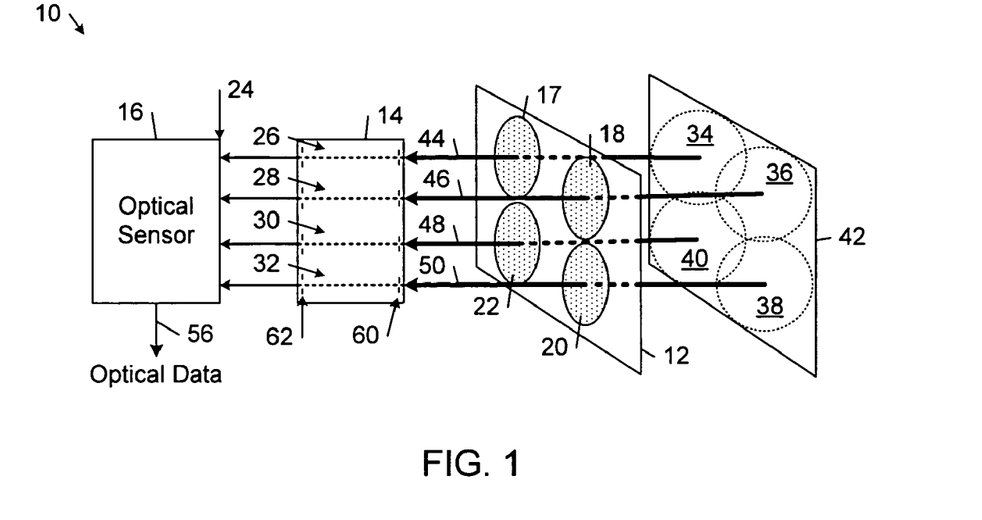
FIG. 1 is a diagrammatic view of an embodiment of an imaging apparatus that includes an optical sensor, a lens system, and an optical stop system.

FIG. 1 shows an embodiment of an imaging apparatus 10 that includes a lens system 12, an optical stop system 14, and an optical sensor 16. The lens system 12 includes an array of lenses 17, 18, 20, 22. The optical sensor 16 includes an array of photocells each of which has a respective photocell active area in a capture plane 24. The optical stop system 14 includes an array of aperture systems 26, 28, 30, 32.

Figure 2:
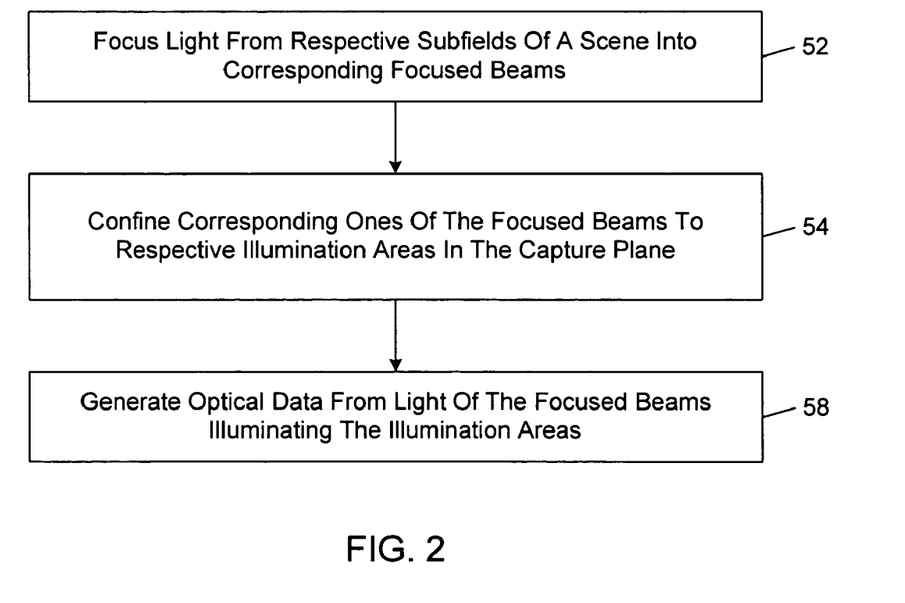
FIG. 2 is a flow diagram of an embodiment of an imaging method.

FIG. 2 shows of an embodiment of an imaging method that is implemented by the imaging apparatus 10. In accordance with this method, each of the lenses 17-22 focuses light from a respective subfield 34, 36, 38, 40 of a scene 42 into corresponding focused beams 44, 46, 48, 50 (FIG. 2, block 52). Each of the aperture systems 26-32 confines a corresponding one of the focused beams 44-50 to a respective illumination area in the capture plane 24 (FIG. 2, block 54). The photocells of the optical sensor 16 generate optical data 56 from light of the focused beams 44-50 that illuminate the illumination areas (FIG. 2, block 58).

The imaging apparatus 10 may be implemented with relatively small and inexpensive components, making it highly suitable for incorporation in any type of device in which image information about the subfields of a scene may be used advantageously, including motion sensing applications, such as image deblurring, motion stabilization, and generating graphical user interface control signals. In some embodiments, the imaging apparatus 10 is incorporated in a mobile device, such as a cellular telephone, a cordless telephone, a portable memory device (e.g., a smart card), a personal digital assistant (PDA), a solid state digital audio player, a CD player, an MCD player, a still image, a video camera, a pc camera, a game controller, a pager, a laptop computer, and other embedded environments.

B. General Features of the Lens System

In general, the lens system 12 focuses light from at least two subfields of the scene 42 onto a focal plane that coincides with the capture plane 24 of the optical sensor 16. Each of the subfields corresponds to a different portion of the scene 42. In a typical embodiment, the lens system 12 includes a planar array of lenses each of which focuses light from a respective one of the subfields onto a respective set of one or more of the photocell active areas in the capture plane 24. The lens system 12 also may include additional optical components, such as additional lenses and optical filters.

C. General Features of the Optical Stop System

The aperture systems 26-32 of the optical stop system 14 control the portions of the focused light beams 44-50 that illuminate the illumination areas in the capture plane 24. In general, each aperture system 26-32 includes a respective input aperture 60 and a respective output aperture 62.

Each of the input apertures 60 passes at least a portion of the light from a respective one of the subfields 34-40. In the illustrated embodiment, the input apertures 60 are located behind (i.e., on the optical sensor side of) the lens system 12. In this embodiment, each of the input apertures 60 passes at least a portion of a corresponding one of the focused beams 44-50. In other embodiments, the input apertures 60 are located in front (i.e., on the object side) of the lens system 12.

Each of the output apertures 62 defines boundaries in the capture plane 24 between the respective illumination area and a respective shadow zone that is free of any light from the passed portion of the corresponding focused beam 44-50. In typical embodiments, the output apertures 62 are configured to prevent the illumination areas from overlapping in any of the active areas of the photocells. This feature can increase the image contrast in the optical data 56 that is produced by the optical sensor 16. For example, in some embodiments, areas of the subfields 34-40 corresponding to the fields of view of the lenses 17-22 overlap (see, e.g., FIG. 1). In these embodiments, the aperture systems 26-32 inhibit cross-talk between the portions of the focused beams 44-50 from the overlapping areas of the subfields 34-40. In this way, these embodiments avoid the reduction of image contrast that otherwise would result from the imaging of the overlapping fields of view of the lenses 17-22.

D. General Features of the Optical Sensor

The optical sensor 16 may be any type of imaging device that is capable of capturing successive images from the subfield light that is focused by the lens system 12 onto the capture plane 24. The optical sensor 16 may be implemented using any type of image sensor technology, including charge coupled device (CCD) image sensor technology or complementary metal-oxide-semiconductor (CMOS) image sensor technology. The optical sensor 16 also may include additional components, such as a still image processing pipeline or a video processing pipeline, that perform one or more front-end operations on the captured image data (e.g., down-sampling, demosaicing, and color-correcting).

In some embodiments, the photocells of the optical sensor 16 are divided into groups of one or more photocells, where each photocell group captures subfield images of a respective one of the illumination areas in the capture plane 24. In some embodiments, the groups of photocells are divided electronically during readout of their pixel values. In other embodiments, the groups of photocells are divided spatially into discrete regions that are distributed across a common substrate (e.g., a silicon chip or a printed circuit board) at locations that are coincident with the illumination areas.

Each of the images that is captured by the optical sensor 16 is formed from a respective contemporaneous set of the subfield images that are captured by the photocell groups. As used herein, the term "contemporaneous" means that the constituent subfield images are captured during the same frame period (or readout cycle) of the optical sensor 16. The contemporaneous subfield images may be captured simultaneously or they may be captured sequentially during the same frame period. The contemporaneous subfield images may be output from the optical sensor 16 serially or in parallel. The optical sensor 16 typically captures each set of contemporaneous subfield images at a rate (e.g., 1500 pictures or frames per second or greater) that is fast enough so that sequential images of the scene 42 overlap.

II. EXEMPLARY IMAGING APPARATUS EMBODIMENTS

A. First Exemplary Imaging Apparatus Embodiment

Figure 3:
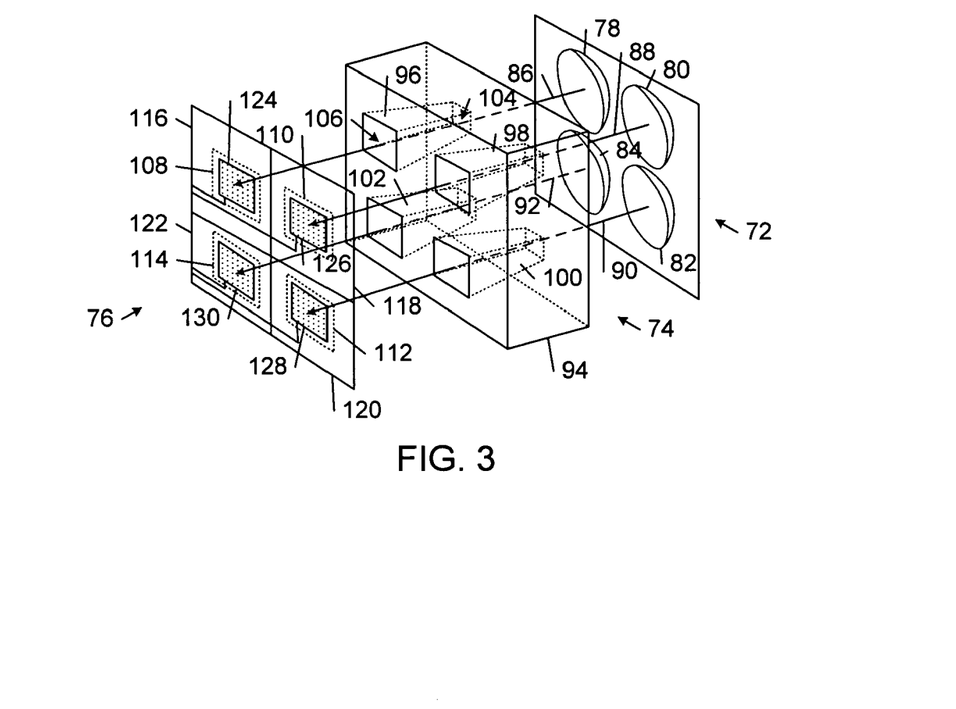
FIG. 3 is a diagrammatic view of an embodiment of the imaging apparatus shown in FIG. 1 that includes an optical stop structure.

FIG. 3 shows an exemplary embodiment 70 of the imaging apparatus 10 that includes an exemplary embodiment 72 of the lens system 12, an exemplary embodiment 74 of the optical stop system 14, and an exemplary embodiment 76 of the optical sensor 16.

The lens system 72 includes a planar array of optical elements 78, 80, 82, 84. In general, the optical elements 78-84 may be any type of optical element that is capable of focusing light onto the capture areas of the focal plane. Exemplary types of optical elements include replicated epoxy lenses and diffractive optical elements (DOEs), such as a computer generated holograms (CGH) and gratings. Each of the optical elements 78-84 has a respective optical axis 86, 88, 90, 92. In the illustrated embodiment, the lens system 72 includes a front side and a back side. The front side of the lens system 72 includes an array of curved surfaces corresponding to respective ones of the optical elements 78-84. The back side of the lens system 72 has a planar surface facing the optical stop system 74.

In some exemplary implementations, each of the lenses 78-84 has a respective front focal plane and a respective back focal plane that coincides with the capture plane 24, where the distances between each front focal plane and the capture plane is less than 5 millimeters. In some of these implementations, the distances between each front focal plane and the capture plane is about 2 millimeters.

The optical stop system 74 includes a substrate 94 that is opaque to light within a specified operating wavelength range of the imaging apparatus 70 (e.g., visible light or infrared light). The substrate 94 includes an array of cavities 96, 98, 100, 102 that define respective aperture systems that are aligned with respective ones of the optical axes 86-92. Each of the cavities 96-102 includes a respective input aperture 104, which function as an aperture stop, and a respective output aperture 106, which functions as a field stop.

Figure 4A:
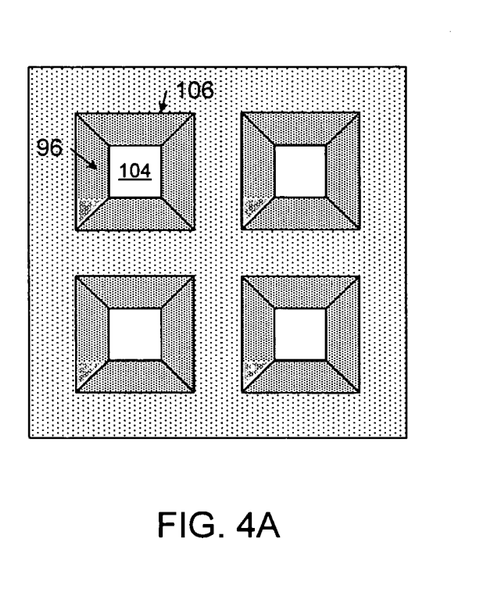
FIG. 4A is a diagrammatic bottom view of an embodiment of the optical stop structure shown in FIG. 3.
Figure 4B:
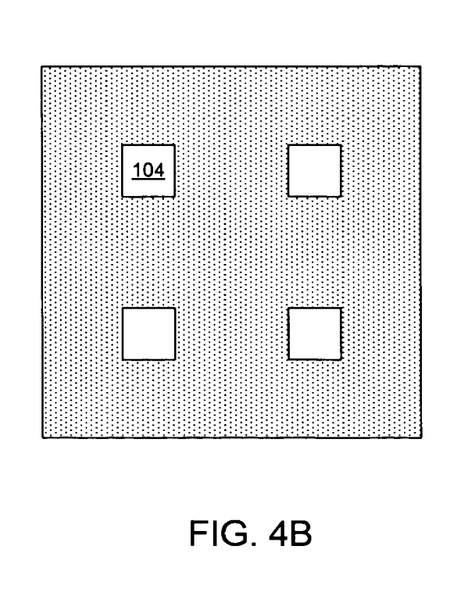
FIG. 4B is a diagrammatic top view of an embodiment of the optical stop structure shown in FIG. 3.

In the embodiment shown in FIGS. 3, 4A, and 4B, each of the input apertures 104 has a square shape, each of the output apertures 106 has a corresponding square shape, and each of the cavities 96-102 has frusto-pyramidal sidewalls. In general, the input and output apertures 104, 106 may be in the shape of any type of regular or irregular closed plane figure, including polygonal shapes (e.g., rectangles, squares, pentagons, hexagons, et seq.), elliptical shapes (e.g., ellipses, circles, and ovals), and arbitrary shapes. Each input aperture 104 and its associated output aperture 106 typically have the same shape; although their respective sizes may be same or different. In the illustrated embodiment, each of the input apertures 104 is smaller than its associated output aperture 106.

Figure 5:
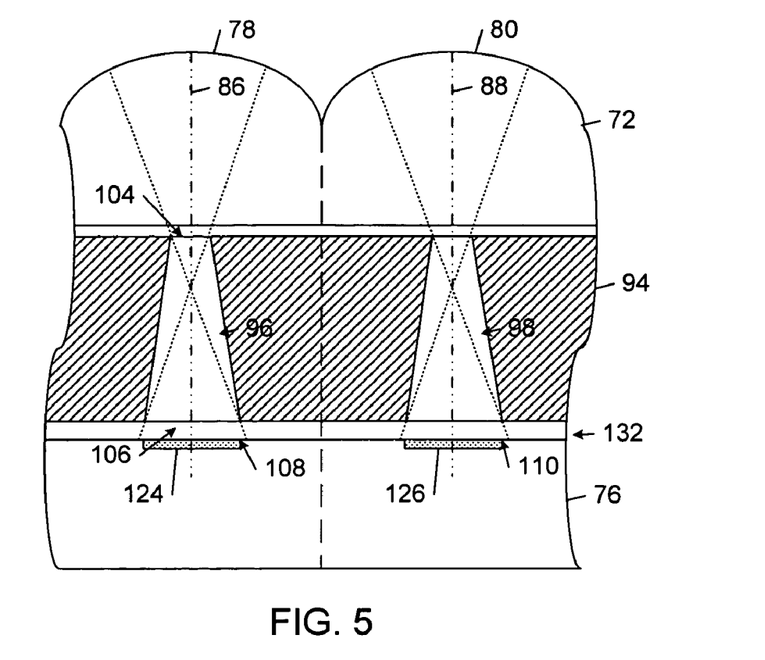
FIG. 5 is a cross-sectional view of an integrated embodiment of the imaging apparatus shown in FIG. 3.

As shown in FIGS. 3 and 5, each of the input apertures 104 passes at least a portion of a corresponding one of the light beams that are focused by the optical elements 78-84. Each of the output apertures 106 defines boundaries 108, 110, 112, 114 between a respective illumination area in the capture plane 24 of the optical sensor 76 and a respective shadow zone that is free of any light from the passed portion of the corresponding focused beam. In this process, each of the input apertures 104 and its corresponding output aperture 106 determines the cone angle of the ray bundle of subfield light that is permitted to illuminate the corresponding illumination area in a capture plane 132, as shown schematically in FIG. 5.

Figure 6:
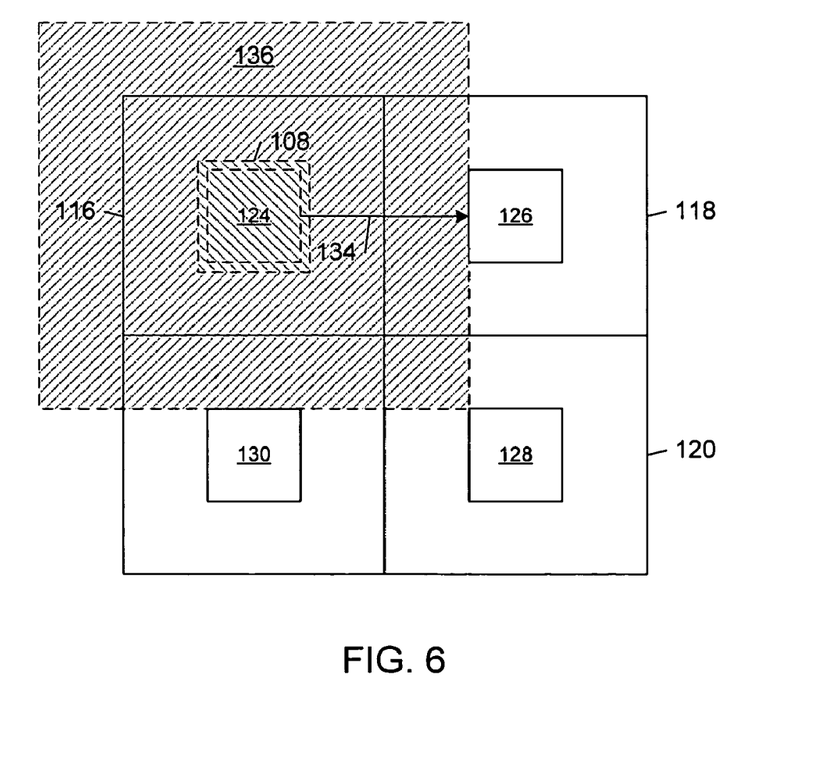
FIG. 6 is a diagrammatic top view of two illumination areas superimposed on a photocell of the optical sensor shown in FIG. 3.

The optical sensor 76 includes a planar array of photocells 116, 118, 120, 122 with respective active areas 124, 126, 128, 130 in the capture plane 132. Each the active areas 124-130 is aligned with a respective one of the optical axes 86-92 that are defined by the optical elements 78-84 of the lens system 72. As shown diagrammatically in FIGS. 5 and 6, each of the illumination areas within a respective one of the boundaries 108-112 illuminates a respective one of the photocell active areas 124-130 with focused light from a respective one of the subfields of the scene. The size of each illumination area typically ranges from the size of the photocell active area to a size that abuts the edges of adjacent ones of the photocell active areas. In the exemplary embodiment shown in FIG. 5, the illumination area 108 is slightly larger than the active area 124. As shown schematically by the arrow 134 in FIG. 6, the size of the illumination area 136 that illuminates the active area 124 may range from the size of the active area 124 to a size that abuts the edges of the adjacent ones of the active areas 126-130. By constraining the sizes of the illumination areas in this way, the optical stop system 74 inhibits cross-talk between adjacent subfields of the scene and, thereby, avoids the reduction in image contrast that otherwise would occur.

In the embodiment illustrated in FIG. 3, the lens system 72 includes four optical elements 78-84, the optical stop system 74 includes four cavities 96-102, and the optical sensor 76 includes four photocells 116-122. Other embodiments may include a larger or smaller number of these associated components.

The exemplary imaging apparatus embodiment shown in FIGS. 3-6 also may include an optical filter that is located between the lens system 72 and the optical sensor 76. In general, the optical filter may be any type of filter that selectively transmits light that has one or more target properties, including a color filter, an absorptive filter, a reflective filter, a monochromatic filter, an infrared filter, a ultraviolet filter, a neutral density filter, a long pass filter, and a short pass filter.

The lens system 72, the optical stop system 74, and the optical sensor 76 may be integrated into a monolithic structure, or they may be implemented by discrete components that are held together by a support frame or mounted in a common housing. In the exemplary embodiment shown in FIG. 5, the lens system 72, the optical stop system 74, and the optical sensor 76 are formed of separate components that are held together by a support structure (not shown) that provides some spacing between the separate components.

B. Second Exemplary Imaging Apparatus Embodiment

Figure 7:
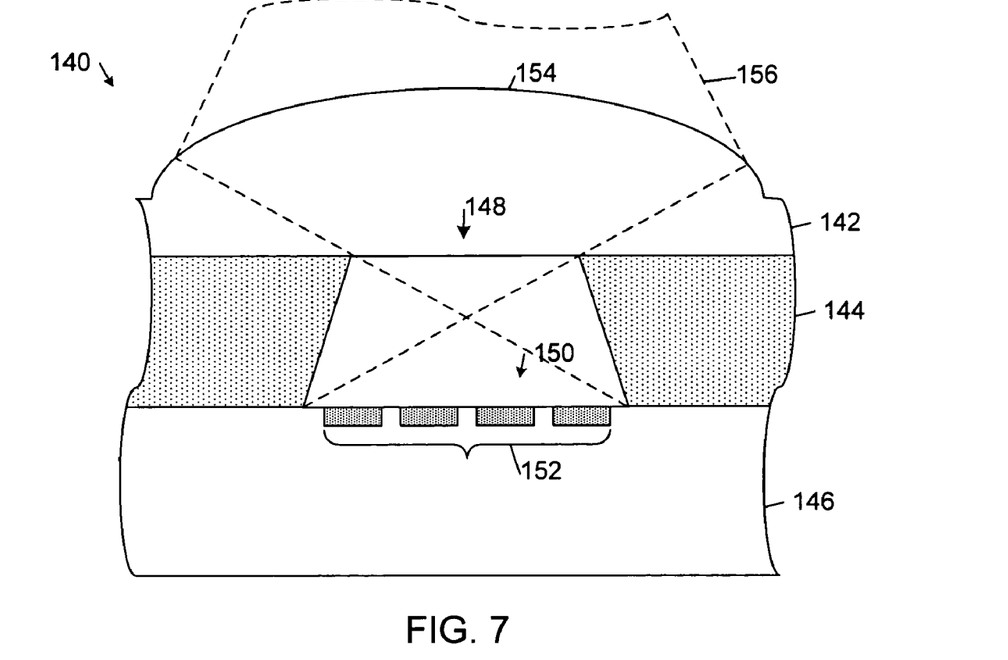
FIG. 7 is a cross-sectional view of an embodiment of an integrated imaging apparatus.

FIG. 7 is a cross-sectional view of a second exemplary embodiment 140 of the imaging apparatus 10. The imaging apparatus 140 includes an exemplary embodiment 142 of the lens system 12, an exemplary embodiment 144 of the optical stop system 14, and an exemplary embodiment 146 of the optical sensor 16. The imaging apparatus 140 corresponds to the imaging apparatus 70 shown in FIG. 3, except that the lens system 142, the optical stop system 144, and the optical sensor 146 are integrated into a unitary monolithic structure and each of the aperture systems 148 defines a respective illumination area 150 that illuminates a respective group 152 of multiple (e.g., 4×4=16) photocell active areas.

In some implementations of this embodiment, the optical sensor 146 includes a planar array of photocells that are clustered into spatially separated groups 152, each of which includes two or more constituent photocells. Exemplary numbers of photocells in each photocell group are P×Q photocells, where each of P and Q has an integer value in a range from two to twenty. Each of the photocell groups 152 in the clustered planar array is aligned with a respective one of the optical elements 154 of the lens system 142.

In operation, each of the optical elements 154 is configured to focus incoming light 156 from the subfields of the scene onto the photocells of the corresponding photocell group 152, as shown diagrammatically in FIG. 7.

C. Third Exemplary Imaging Apparatus Embodiment

Figure 8:
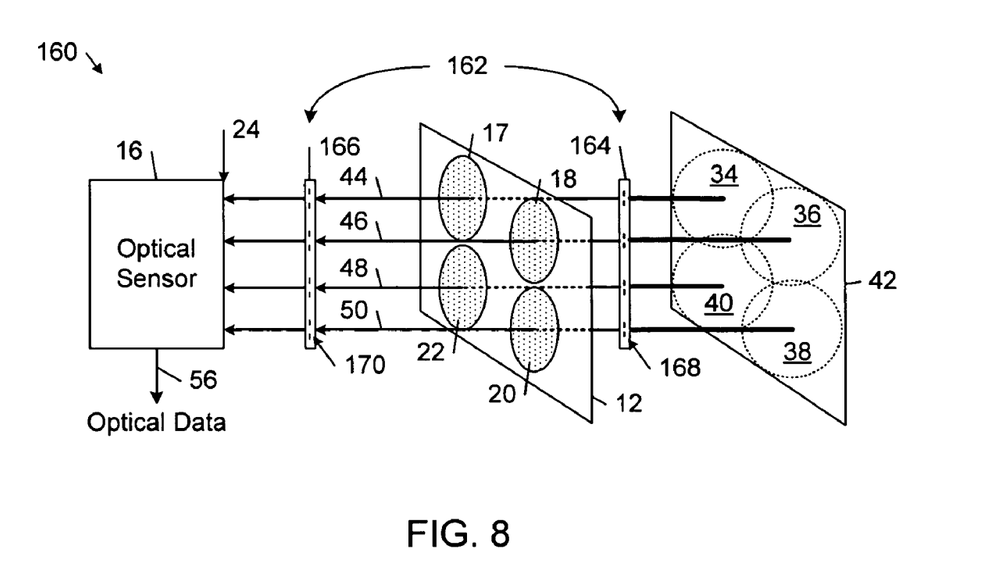
FIG. 8 is a diagrammatic view of an embodiment of an imaging apparatus.

FIG. 8 is a diagrammatic view of an embodiment of an imaging apparatus 160 that corresponds to the imaging apparatus 10 shown in FIG. 1, except that the optical stop system 162 includes a front stop system 164 located in front (i.e., on the object side) of the lens system 12 and a back stop system 166 located behind the lens system 12. The front stop system 164 includes an array of input apertures 168 that perform an analogous function as the function of the input apertures 60 in the optical stop system 14. The back stop system 166 includes an array of output apertures 170 that perform an analogous function as the function of the output apertures 62 in the optical stop system 14.

In one exemplary implementation of the imaging apparatus 160, the lens system 12 includes a lens substrate that has a planar front surface and a back surface that includes curved surfaces respectively corresponding to the lenses 17-22. In this implementation, the planar front surface of the lens substrate is painted or plated with a material that is opaque to light within the specified operating wavelength range of the imaging apparatus 160 except in the areas of the input apertures 168. The output apertures 170 may be defined in thin plate of plastic or metal material that is opaque to light within the specified operating wavelength range. Alternatively, the output apertures 170 may be defined by a layer of opaque material that is painted or plated on an optical substrate that is transparent to light within the specified operating wavelength range. The optical substrate may be mounted to the optical sensor 16 in alignment with the photocells.

III. EXEMPLARY APPLICATION ENVIRONMENTS FOR THE IMAGING APPARATUS EMBODIMENTS

As explained above, the imaging apparatus embodiments that are described herein may be implemented with relatively small and inexpensive components, making them highly suitable for incorporation in any type of device in which image information about the subfields of a scene may be used advantageously, including motion sensing applications, such as image deblurring, motion stabilization, and generating graphical user interface control signals. In some embodiments, these imaging apparatus are incorporated in a mobile device, such as a cellular telephone, a cordless telephone, a portable memory device (e.g., a smart card), a personal digital assistant (PDA), a solid state digital audio player, a CD player, an MCD player, a still image, a video camera, a pc camera, a game controller, a pager, a laptop computer, and other embedded environments.

Figure 9:
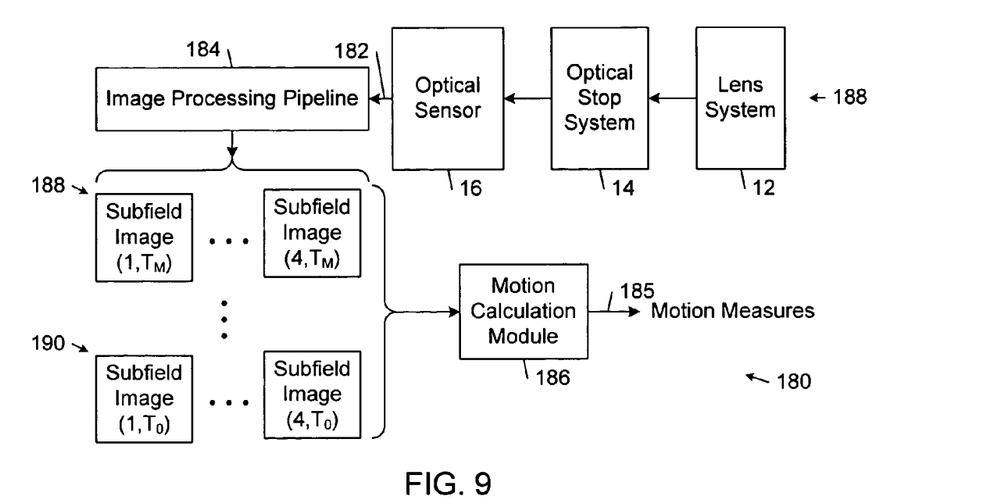
FIG. 9 is a block diagram of an embodiment of the imaging apparatus of FIG. 1 that is incorporated in an optical navigation apparatus.

FIG. 9 is a block diagram of an embodiment of the imaging apparatus 10 that is incorporated in an optical navigation apparatus 180 that additionally includes a processing system that includes an image processing pipeline 184 and a motion calculation module 186 that produces motion measures 185 from the output of the image processing pipeline 184.

The image processing pipeline 184 converts the raw image data 182 that is produced by the photocells of the optical sensor 16 into successive images 188, . . . , 190 each of which is composed of a respective set of contemporaneous subfield images. In particular, during each frame period, the image processing pipeline 184 generates a set of subfield images from the subfield light that is focused onto photocells in the respective illumination areas in the capture plane. For example, during the frame period $T_0$, the image processing pipeline 184 generates the subfield images (i.e., "Subfield Image $(1,T_0)$", . . . , "Subfield Image $(4,T_0)$") of the image 188, and during the frame period $T_M$, the image processing pipeline 184 generates the subfield images (i.e., "Subfield Image $(1,T_M)$", . . . , "Subfield Image $(4,T_M)$") of the image 190. The image processing pipeline 184 may be a still image processing pipeline or a video processing pipeline, depending on the application environment in which the navigation sensor 180 is implemented. In the process of converting the raw image data into the subfield images, the image processing pipeline 184 may perform one or more front-end operations on the captured image data 182, including down-sampling, demosaicing, and color-correcting.

In general, the motion calculation module 186 may use any of a wide variety of different methods to determine the motion measures 185, which typically correspond to one or more of displacement parameter values, velocity parameter values, and acceleration parameter values. In some embodiments, the motion calculation module 186 generates the motion measures 185 based on comparisons of successive ones of the images 188, . . . , 190 that are generated by the image processing pipeline 184. In some embodiments, the motion calculation module 186 identifies texture or other features in corresponding ones of the images 188, . . . , 190 and tracks the motion of such features across the successive images 188, . . . , 190. In some implementations, the motion calculation module 186 correlates the features that are identified in successive images to obtain information relating to the position of the optical navigation system 180 in relation to the scene being imaged. In some embodiments, the motion calculation module 186 identifies common features in sequential images and determines the direction and distance by which the identified common features are shifted or displaced. In some of these embodiments, the motion calculation module 186 translates the displacement information into two-dimensional position coordinates (e.g., x and y coordinates) that correspond to the relative position of the optical navigation system 180.

In general, the image processing pipeline 184 and the motion calculation module 186 may be implemented by one or more discrete modules of the processing system. These modules are not limited to any particular hardware, firmware, or software configuration. Instead, these modules may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the functionality of these modules and the data they generate are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

Figure 10:
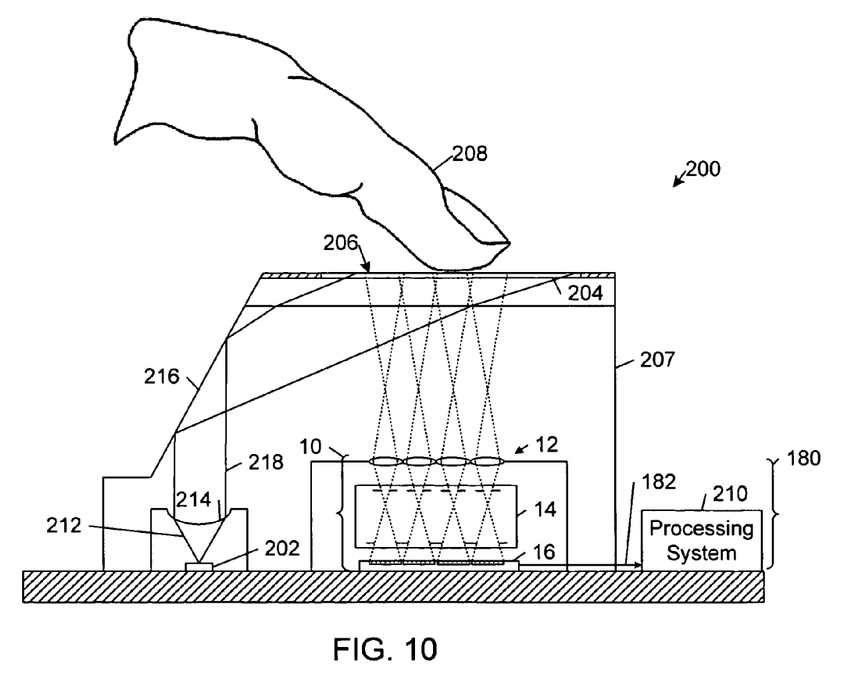
FIG. 10 is a block diagram of an embodiment of the imaging apparatus of FIG. 1 that is incorporated in an optical input apparatus.

FIG. 10 is a block diagram of an embodiment of the optical navigation sensor 180 that is incorporated in an optical input apparatus 200. The optical input apparatus 200 additionally includes a light source 202 and a window 204 that has a contact surface 206. The light source 202 and the imaging apparatus 10 are contained within cavities of a housing 207, which typically is formed of a refractive material, such as plastic, that is transparent to light within a specified operating wavelength range.

In operation, a user typically touches the contact surface 206 with a finger 208, the imaging apparatus 10 captures movement of the user's finger 208 across the contact surface 206, and the processing system 210 translates the optical data 182 generated by the optical sensor 16 into motion measures. In some operational environments, the optical navigation sensor 180 derives display control signals from the motion measures and passes the display control signals to a display controller that drives a display 24. The display controller processes the display control signals to control, for example, the movement of a pointer on the display. The display controller 22 typically executes a driver to process the display control signals. In general, the driver may be implemented in any computing or processing environment, including in digital electronic circuitry or in computer hardware, firmware, or software. In some embodiments, the driver is a component of an operating system or a software application program.

The window 204 is substantially transparent to light within the specified operating wavelength range (e.g., visible or infrared light) of the image apparatus 10. The window 204 may be formed of glass or other wear resistant material, such as plastic, that is transparent to light within the target wavelength range.

The light source 202 (e.g., a light emitting diode or a laser) produces light 212 within the specified operating wavelength range. An optical element 214 collimates the light 212 and a reflective optical element 216 directs the collimated light 218 toward the contact surface 206. The light source 202 illuminates the contact surface 202 through the window 204. In these embodiments, the light 218 passes through the window 204 and out the contact surface 206 except in areas where an object (e.g., the ridges of the user's fingertip 208) is in contact with the contact surface 206. The light reflected from the object is captured by the imaging apparatus 10. In other embodiments, the light source 202 may be configured to inject light into an edge of the window 204. In these embodiments, an optical element (e.g., a cylindrical lens) may be used to provide a uniform injection of light into the window 204. The injected light is retained within the window 204 by total internal reflection except in areas where an object (e.g., the ridges of the user's fingertip 208) is in contact with the contact surface 206. Such contact disrupts the total internal reflection within the window 204, causing the injected light to be directed toward the imaging apparatus 10.

IV. CONCLUSION

The embodiments that are described in detail herein provided improved imaging apparatus and methods that are capable of satisfying the significant size constraints of compact imaging application environments.

Other embodiments are within the scope of the claims.

What is claimed is:

1. An apparatus, comprising:
   an optical sensor comprising photocells each having a respective photocell active area in a capture plane;
   a lens system comprising lenses each operable to focus light from a respective subfield of a scene into a corresponding focused beam; and
   an optical stop system comprising aperture systems each confining a corresponding one of the focused beams to a respective illumination area in the capture plane,
   wherein each of the aperture systems is defined by a cavity having an input aperture and an output aperture, wherein the size of the output aperture is greater than the size of the input aperture, wherein the shape of each of the output aperture and the input aperture is a polygon, and wherein the output aperture is configured relative to the configuration of the input aperture and in such a way that causes the cavity defined thereby to confine the illumination area of its respective aperture system in such a way that the illumination area does not overlap with the illumination area of adjacent aperture systems.

2. The apparatus of claim 1, wherein each of the lenses is aligned with a respective one of aperture systems along a respective optical axis.

3. The apparatus of claim 2, wherein each of the illumination areas is centered with respect to a respective one of the optical axes.

4. The apparatus of claim 1, wherein the lens system comprises a front side and a back side, the front side comprises an array of curved surfaces corresponding to respective ones of the lenses, and the back side comprises a planar surface adjacent the optical stop system.

5. The apparatus of claim 1, wherein the illumination areas respectively encompass mutually exclusive sets of one or more of the photocell active areas.

6. The apparatus of claim 1, wherein the optical stop system confines the focused beams to respective non-overlapping illumination areas in the capture plane.

7. The apparatus of claim 1, wherein the optical stop system is incorporated in an optical stop structure between the lens system and the optical sensor.

8. The apparatus of claim 7, wherein the optical stop structure comprises a substrate that is opaque to light within a specified wavelength range, and the substrate comprises cavities each defining a respective one of the aperture systems.

9. The apparatus of claim 8, wherein each of the cavities comprises an input aperture and an output aperture, the input aperture passes at least a portion of a corresponding one of the focused beams, and the output aperture defines boundaries in the capture plane between the respective illumination area and a respective shadow zone free of any light from the passed portion of the corresponding focused beam.

10. The apparatus of claim 8, wherein each of the cavities has frustopyramidal sidewalls.

11. The apparatus of claim 1, wherein each of the aperture systems includes an input aperture on an object side of the lens system and an output aperture between the lens system and the optical sensor.

12. The apparatus of claim 1, wherein each of the aperture systems comprises an input aperture and an output aperture, the input aperture passes at least a portion of a corresponding one of the focused beams, and the output aperture blocks light in the passed portion of the corresponding focused beam directed to areas of the capture plane outside of the respective illumination area.

13. The apparatus of claim 12, wherein each of the input apertures is rectangular and each of the output apertures is rectangular.

14. The apparatus of claim 1 wherein each of the lenses has a respective front focal plane and a respective back focal plane that coincides with the capture plane, wherein the distances between each front focal plane and the capture plane is less than 5 millimeters.

15. The apparatus of claim 1, wherein the optical sensor, the lens system, and the optical stop structure are integrated into a unitary structure.

16. The apparatus of claim 1, wherein the optical sensor is operable to generate optical data from light focused by the lenses onto the illumination areas, and further comprising a processing system operable to produce motion measures indicative of movement in relation to the scene from the optical data.

17. The apparatus of claim 16, wherein the optical sensor is operable to capture successive images composed of images the subfields focused onto the photocell active areas in the illumination areas, and the processing system produces motion measures from comparisons of ones of the captured images.

18. The apparatus of claim 1, wherein the lens system and the optical stop system form light from the scene into a parallel array of the focused beams, each of the lenses is aligned spatially with a corresponding one of the aperture systems to define a respective image-forming light channel, and light from the subfields of the scene passes through different respective ones of the image-forming light channels to form respective images of the respective subfields in respective ones of the illumination areas in the capture plane.

19. The apparatus of claim 18, wherein each of the aperture systems comprises a respective aperture stop that is paired with a respective spatially-aligned field stop, and each of the pairs of the aperture stops and the field stops determines a respective cone angle of a respective light ray bundle of light from a respective one of the subfields in the respective one of the image-forming light channels.

20. The apparatus of claim 1, wherein the focused beams have different respective parallel optical axes.

21. The apparatus of claim 1, wherein the lenses are arranged in a planar array.

22. A system, comprising:
   means for focusing light from respective subfields of a scene into corresponding focused beams;
   means for confining corresponding ones of the focused beams to respective non-overlapping illumination areas in the capture plane, wherein the confining means includes aperture systems each defined by a cavity having an input aperture and an output aperture, wherein the size of the output aperture is greater than the size of the input aperture, wherein the shape of each of the output aperture and the input aperture is a polygon, and wherein the output aperture is configured relative to the configuration of the input aperture and in such a way that causes the cavity defined thereby to confine the illumination area of its respective aperture system in such a way that the illumination area does not overlap with the illumination area of adjacent aperture systems;

means for generating optical data from light of the focused beams illuminating the illumination areas; and means for producing motion measures indicative of movement in relation to the scene from the optical data.

23. A method, comprising:

focusing light from respective subfields of a scene into corresponding focused beams;

confining corresponding ones of the focused beams to respective non-overlapping illumination areas in the capture plane by configuring an output aperture and an input aperture of a cavity defined thereby in an aperture system corresponding to the focused beams in such a way that the size of the output aperture is greater than the size of the input aperture and the shape of each of the output aperture and the input aperture is a polygon;

generating optical data from light of the focused beams illuminating the illumination areas; and producing motion measures indicative of movement in relation to the scene from the optical data.

24. The method of claim 23, wherein the confining comprises passing at least a portion of a corresponding one of the focused beams, and blocking light in the passed portion of the corresponding focused beam directed to areas of the capture plane outside of the respective illumination area.

25. The method of claim 23, further comprising producing motion measures indicative of movement in relation to the scene from the optical data.

26. The method of claim 23, wherein the generating comprises capturing successive images composed of images of the subfields focused onto the illumination areas, and the producing comprises producing motion measures from comparisons of ones of the captured images.

27. An apparatus, comprising:

an optical sensor comprising photocells each having a respective photocell active area in a capture plane;

a lens system comprising lenses each operable to focus light from a different respective subfield of a scene into a corresponding one of multiple focused beams having different respective parallel optical axes; and an optical stop system comprising aperture systems each confining a corresponding one of the focused beams to a different respective illumination area in the capture plane, wherein each of the focused beams forms a respective image in a respective one of the illumination areas, wherein each of the aperture systems is defined by a cavity having an input aperture and an output aperture, wherein the size of the output aperture is greater than the size of the input aperture, wherein the shape of each of the output aperture and the input aperture is a polygon, and wherein the output aperture is configured relative to the configuration of the input aperture and in such a way that causes the cavity defined thereby to confine the illumination area of its respective aperture system in such a way that the illumination area does not overlap with the illumination area of adjacent aperture systems.

28. The apparatus of claim 27, wherein each of the aperture systems comprises a respective aperture stop that is paired with a respective spatially-aligned field stop, and each of the pairs of the aperture stops and the field stops determines a respective cone angle of a respective light ray bundle of light from a respective one of the subfields in the respective one of the focused beams.

* * * * *